United States Patent [19]

Vogt et al.

[11] Patent Number: 4,475,765
[45] Date of Patent: Oct. 9, 1984

[54] MOTOR VEHICLE ROOF OF COMPOSITE MATERIAL

[75] Inventors: Hans Vogt, Overath; Herbert Kloppe, Pulheim; Erwin Spiegel, Bergheim, all of Fed. Rep. of Germany

[73] Assignee: Ford Motor Company, Dearborn, Mich.

[21] Appl. No.: 452,668

[22] Filed: Dec. 23, 1982

[30] Foreign Application Priority Data

Jan. 27, 1982 [DE] Fed. Rep. of Germany ....... 3202594

[51] Int. Cl.$^3$ ............................................. B62D 25/06
[52] U.S. Cl. ...................................... 296/210; 428/99
[58] Field of Search ................... 296/210, 214; 428/99

[56] References Cited

U.S. PATENT DOCUMENTS 4,119,749 10/1978 Roth et al. .......................... 296/210

FOREIGN PATENT DOCUMENTS 2845708 4/1980 Fed. Rep. of Germany .
2929689 2/1981 Fed. Rep. of Germany .

Primary Examiner—Robert R. Song
Attorney, Agent, or Firm—Daniel M. Stock; Clifford L. Sadler

[57] ABSTRACT

In a motor vehicle body, a rigidly fastened roof (10) of composite material rests upon a frame rigid with the body as a complete prefabricated component. The roof (10) is formed as a composite component which is produced in a hot pressing process and is formed by an air-tight and rain-proof outer layer (11), an intermediate structural layer (12) and a semi-rigid, porous inner layer (13) with a padding and/or decorative layer (14). The continuous edge around the roof is shaped by hot pressing deformation of all the layers to form joining flange areas of different cross-sections which are joined to the areas of the frame rigid with the body by a permanently resilient, vibration-absorbing adhesive bead and by additional screw connections at strategic points.

5 Claims, 6 Drawing Figures

MOTOR VEHICLE ROOF OF COMPOSITE MATERIAL

BACKGROUND OF THE INVENTION

1. Field of Invention

This invention relates to a motor vehicle roof of composite material.

2. Description of the Prior Art

A motor vehicle body with a rigidly fastened roof is known from the German Offenlegungsschrift No. 28 45 708, in which a sandwich plate is used, which is completed by cover strips and overlays of padding and/or covering material to form a prefabricated component which, resting on an area of the frame rigid with the body, is rigidly fastened to the latter by an adhesive.

This known motor vehicle roof has the disadvantage that from the cutting of the sandwich plate to size, and through the application of the cover strips and the overlays of padding and/or covering material, a multiplicity of working stages is required before the prefabricated component may be laid on to and secured to the vehicle. Furthermore, a roof of this type has an inadequate degree of sound absorption, since only the overlay of padding and/or covering material applied to the continuous underside of the sandwich plate is effective.

A further motor vehicle body with a rigidly fastened roof of composite material is known from the German Offenlegungsschrift No. 29 29 689, in which the composite material used is in the form of a plate-like outer shell which is made of glass-fiber-reinforced plastics material and is provided with ribs. To the inside, a roof lining is applied consisting of a layer of polyurethane foam and a covering sheet. The continuous edge areas of the outer shell of glass-fiber-reinforced plastics material have different cross-sections and have clip-like fasteners for securing the prefabricated component to the area of the frame rigid with the body with the interposition of a seal.

This motor vehicle roof also has the disadvantage that the manufacture of the glass-fiber-reinforced outer shell, the foaming of the polyurethane foam layer and the application of the covering sheet, all require a multiplicity of working stages before the prefabricated component may be laid on to and secured to the vehicle. The outer shell made of glass-fiber-reinforced plastics material can form corresponding rain channels in the region of the longitudinal sides of the roof.

SUMMARY OF THE INVENTION

According to the invention, there is provided a roof for a motor vehicle body in the form of a layered composite component which is produced in essentially a single hot pressing process and is formed by an impermeable outer layer, an intermediate structural layer, a semi-rigid, porous layer and a padding and/or decorative inner layer, having a continuous edge area being shaped by hot pressing deformation of all the layers to form joining flange areas to different cross-sections adapted to be jointed to areas of the rame rigid with the body by a permanently resilient, vibration-absorbing adhesive bead and, in addition, by screw connections at strategic points.

BRIEF DESCRIPTION OF THE DRAWINGS

The invention is described in greater detail by way of example, with reference to the accompanying drawings, in which.

DESCRIPTION OF A PREFERRED EMBODIMENT

Various sections through a roof frame 1 rigid with the body are shown in the various figures. The roof frame 1 is formed essentially by an inner sheet 2 and an outer sheet 3. The sheets 2 and 3 of the roof frame may, of course, be formed by parts of an inner and an outer wall of the body.

Figure 1:
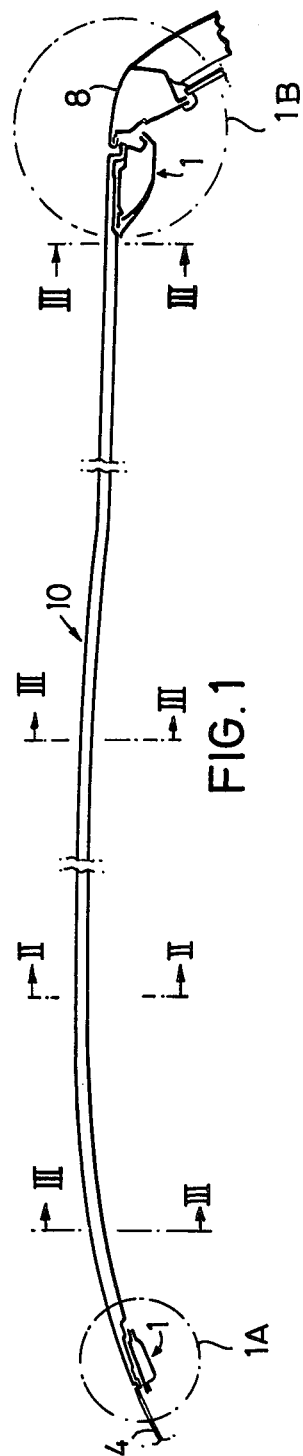
FIG. 1 is a longitudinal vertical central section, contracted in its longitudinal extent, through a motor vehicle body with a roof according to the invention.
Figure 1A:
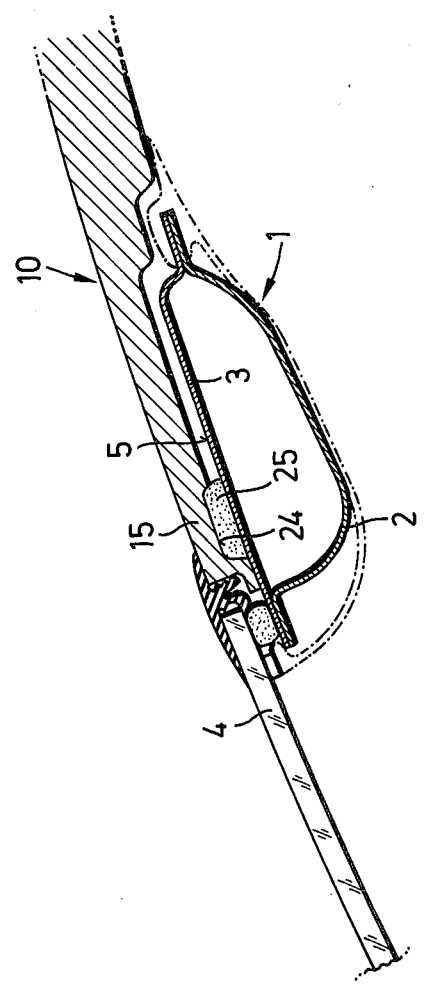
FIG. 1A is an enlarged view of the section in circle 1A in FIG. 1.
Figure 1B:
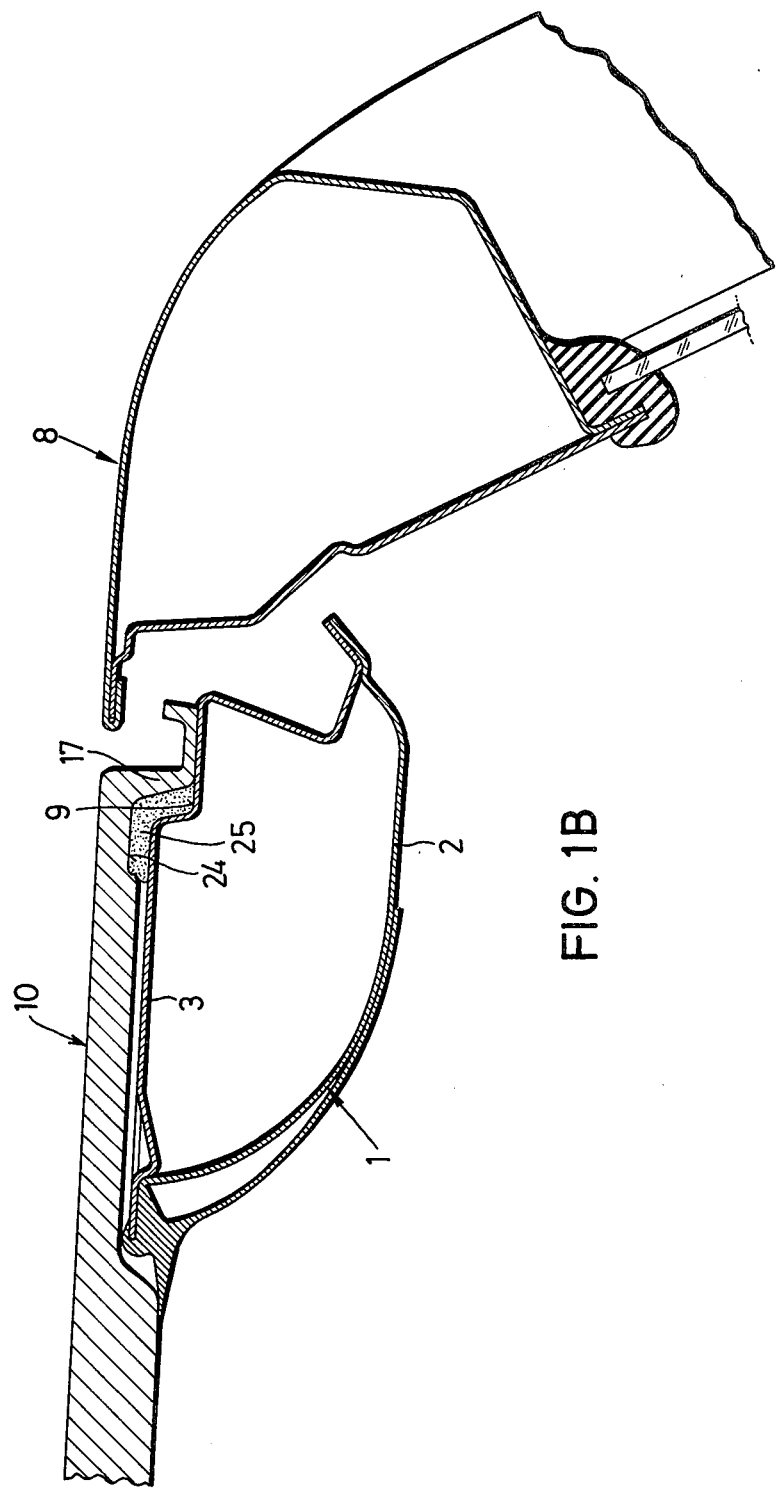
FIG. 1B is an enlarged view of the section in circle 1B in FIG. 1.
Figure 2:
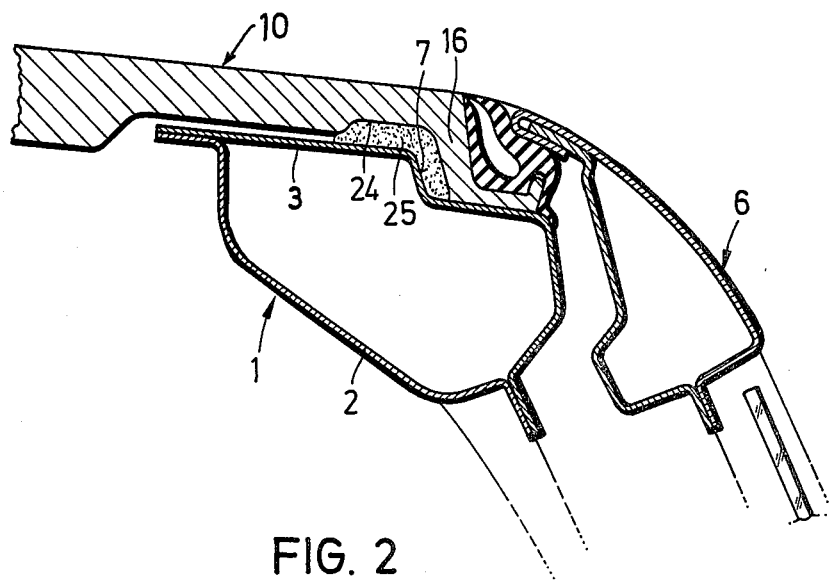
FIG. 2 is a vertical section along the line II—II in FIG. 1.
Figure 3:
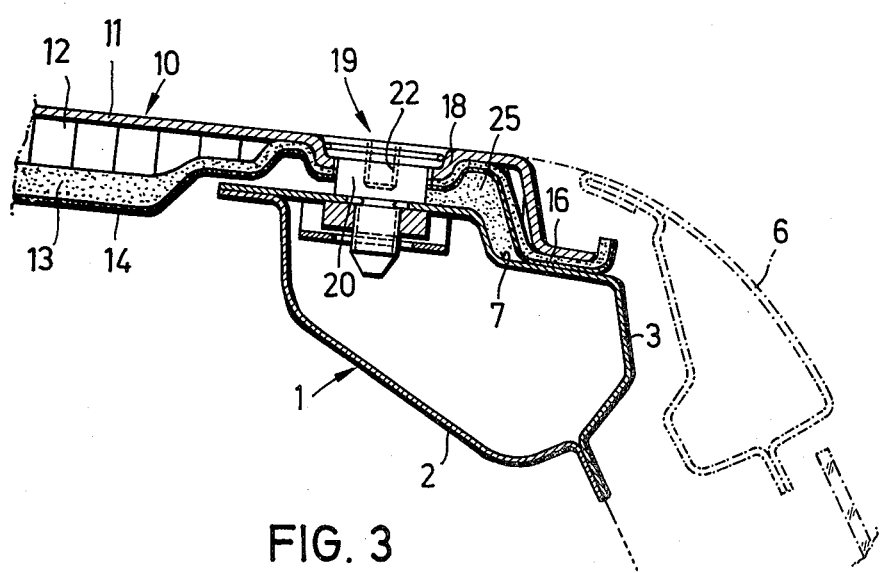
FIG. 3 is a vertical section along the line III—III in FIG. 1.

At the front, the outer sheet 3 of the roof frame is provided with a flat area 5 adjacent the upper edge of the windscreen 4. Adjacent the doors, an area 7 of the frame is recessed, as may best be seen in FIG. 2, in stages in the region of the side walls overlapped by the doors 6. In the region of the tailgate 8, an area 9 of the frame is likewise recessed in stages, as may best be seen in FIG. 1B.

Figure 4:
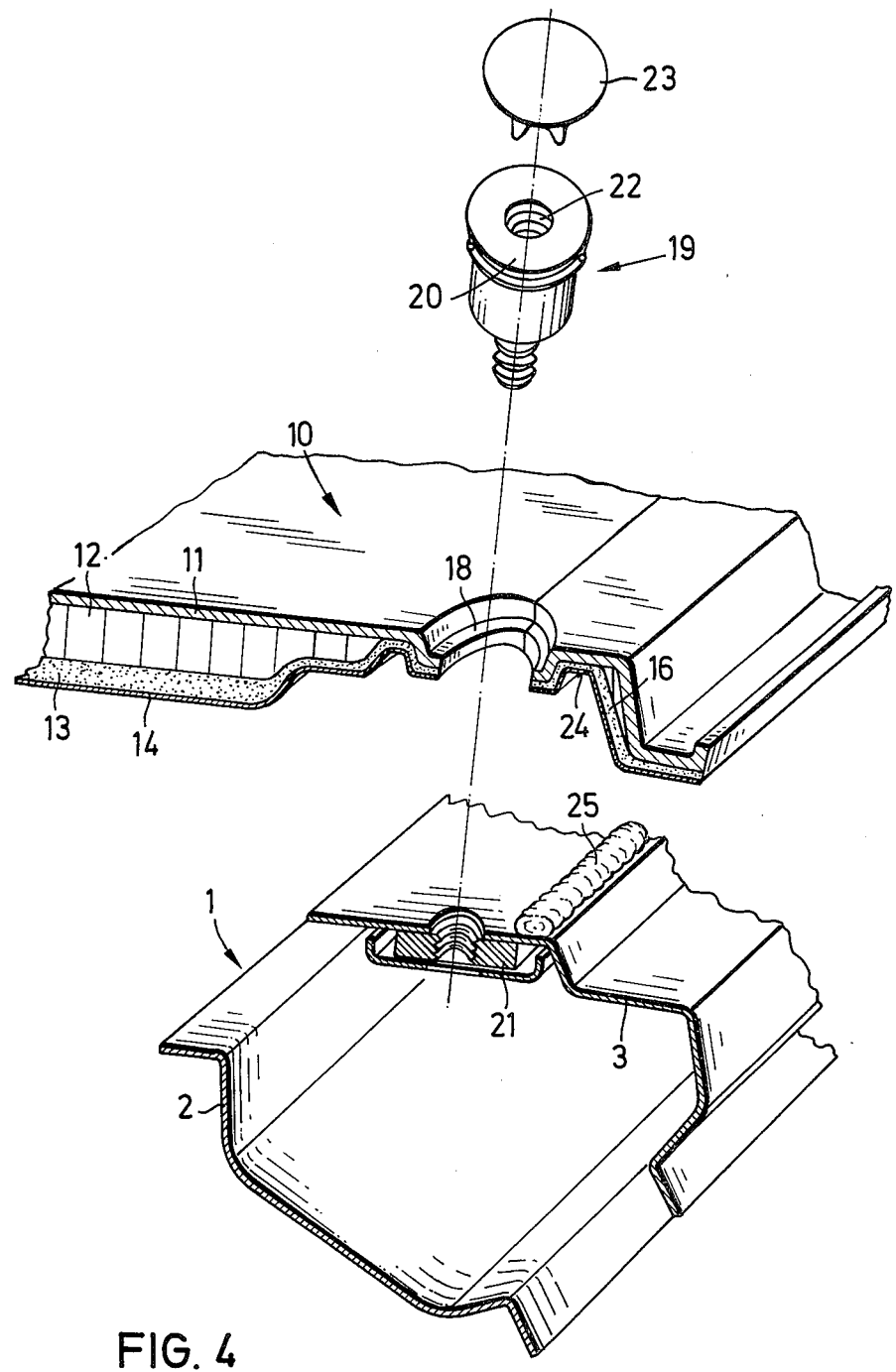
FIG. 4 is an exploded view of the roof components in the region of an additional screw connection.

The structure of the roof 10 of composite material may best be seen from FIG. 4. The roof consists of an air-tight and rain-proof outer layer 11, an intermediate honeycomb/structural layer 12 and a semi-rigid, porous inner layer 13 with a padding and/or decorative layer 14.

The roof of composite material is produced in this case in a single hot pressing process, the joining flange areas of different cross-sections—15 on the windscreen 4, 16 adjacent the vehicle doors 6, and 17 adjacent the tailgate 8—being formed by hot pressing deformation of all the layers of the laminar composition.

Fastening openings 18 for additional screw connections 19 are formed at strategic points in the joining flange areas.

Screw connections 19 consist of special hollow screws 20 which cooperate with corresponding threaded reinforcement plates 21 on the roof frame.

A cover 23 of plastics material is inserted into the outwardly open threaded bores 22 of the special hollow screws 20, and this cover 23 is designed to be easily removed, since the threaded bores 22 of the special hollow screws 20 are intended as mounting points for fastening a roof rack.

All the joining flange areas 15, 16 and 17 of the roof 10 are provided with a continuous receiving groove 24 for a vibration-absorbing, permanently resilient adhesive bead 25.

The materials of the individual layers of the roof 10 of composite materials produced in the hot pressing process are selected as follows:

A material with a scratch-proof surface, which also corresponds to the desired finished color of the motor vehicle body, is selected for the air-tight and rain-proof outer layer 11, so that the prefabricated roof of composite material need not undergo the conventional lacquering process of a motor vehicle body.

Honeycomb or lattice structures of aluminum or cardboard webbing as well as rigid foam and fleece structures are possible for the intermediate honeycomb/structural layer 12.

A foam or fleece-like, sound-absorbing porous material with a flow resistance of preferably 30 to 60 rayl (German units) is selected for the semi-rigid, porous inner layer 13.

Conventional air-permeable, thin, resilient foam layers with corresponding perforated lining sheets or lining materials can be used for the padding and/or decorative layer.

Fastening the roof of composite material by way of a vibration-absorbing, permanently resilient adhesive bead together with special screw connections offers the advantage that the roof is completely incorporated into the supporting structure of the body and, nevertheless, is to a certain extent acoustically insulated from the latter.

In this way, on the one hand, the roof of composite material secured to the area of the frame rigid with the body does not react in the manner of a diaphragm to vibrations in the body, and, on the other hand, noises which occur in the interior of the vehicle are absorbed in an appropriate manner by the porous inner structure of the roof material.

The roof described is thus a composite component which is produced in a hot pressing process and is formed by an air-tight and rain-proof outer layer, an intermediative honeycomb/structural layer and a semi-rigid, porous inner layer with a padding and/or decorative layer. The continuous edge area of the composite component is shaped by hot pressing deformation of all the layers to form joining flange areas of various cross-sections which are joined to the area of the frame rigid with the body of a permanently resilient, vibration-absorbing adhesive bead, and by screw connections provided at strategic points. As a result, a motor vehicle roof of composite material is produced in such a way that the complete prefabricated roof component is fully incorporated into the supporting structure of the body, and, in addition, in terms of acoustics, has a sound absorbing action.

What is claimed is:

1. A roof for a motor vehicle body in the form of a layered composite component which is produced in a hot pressing process and comprising an impermeable outer layer, an intermediate structural layer, a semi-rigid, porous layer positioned inwardly adjacent and supportively engaging the intermediate layer and a padding and/or decorative inner layer inwardly adjacent the semi-rigid layer, the continuous edge area of the roof being shaped by hot pressing deformation of all the layers to form joining flange areas of different cross-sections adapted to be jointed to areas of the frame rigid with the body by a permanently resilient, vibration-absorbing adhesive bead and by screw connections at strategic points proximate the bead.

2. A roof according to claim 1, wherein the impermeable outer layer consists of a self-colored material having a scratch-proof surface.

3. A roof according to claim 2, wherein the intermediate structural layer consists of a honeycomb web structure of aluminum, plastics material or cardboard.

4. A roof according to claim 3, wherein the semi-rigid, porous layer consists of a sound-absorbing fleece layer with an air-flow resistance of 30 to 60 rayl.

5. A roof according to claim 1, wherein the screw connections have outwardly open threaded bores closeable by a cover and exposeable so that they can be used to secure an article to the vehicle.

* * * * *